United States Patent
Hara et al.

(10) Patent No.: US 9,997,782 B2
(45) Date of Patent: Jun. 12, 2018

(54) BISPHENOL-BASED RESIN, ELECTRODE, LEAD STORAGE BATTERY, PRODUCTION METHODS FOR THESE, AND RESIN COMPOSITION

(71) Applicant: HITACHI CHEMICAL COMPANY, LTD., Tokyo (JP)

(72) Inventors: Kousuke Hara, Tokyo (JP); Takeshi Yamashita, Tokyo (JP); Satoko Ueda, Tokyo (JP); Kouji Kogure, Tokyo (JP)

(73) Assignee: HITACHI CHEMICAL COMPANY, LTD, Tokyo (JP)

( * ) Notice: Subject to any disclaimer, the term of this patent is extended or adjusted under 35 U.S.C. 154(b) by 0 days. days.

(21) Appl. No.: 15/710,859

(22) Filed: Sep. 21, 2017

(65) Prior Publication Data

US 2018/0076460 A1    Mar. 15, 2018

Related U.S. Application Data

(63) Continuation-in-part of application No. 15/302,917, filed as application No. PCT/JP2015/060883 on Apr. 7, 2015, now abandoned.

(30) Foreign Application Priority Data

Apr. 8, 2014    (JP) .................................. 2014-079550

(51) Int. Cl.
*H01L 47/00*    (2006.01)
*H01M 4/62*    (2006.01)
(Continued)

(52) U.S. Cl.
CPC ............ *H01M 4/622* (2013.01); *C08G 14/06* (2013.01); *H01M 4/20* (2013.01); *H01M 10/06* (2013.01)

(58) Field of Classification Search
CPC ........ C08G 14/04; C08G 14/00; C08G 14/12; C08G 73/22; C08L 79/04
See application file for complete search history.

(56) References Cited

U.S. PATENT DOCUMENTS

| 6,074,782 A | 6/2000 | Mizutani | |
| 2013/0157118 A1* | 6/2013 | Shibahara | ............... H01M 4/14 429/163 |
| 2013/0280595 A1 | 10/2013 | Kogure | |

FOREIGN PATENT DOCUMENTS

| JP | H6-039514 A | 6/1991 |
| JP | H6-060041 A | 8/1991 |
| (Continued) | | |

OTHER PUBLICATIONS

International Search Report of WO Appln. No. PCT/JP2015/060883 dated Jul. 14, 2015 in English.

(Continued)

*Primary Examiner* — Shane Fang
(74) *Attorney, Agent, or Firm* — Fitch, Even, Tabin & Flannery, LLP

(57) ABSTRACT

An electrode includes an electrode layer including an electrode active material or a raw material of an electrode active material and a bisphenol-based resin, and a current collector supporting the electrode layer. The bisphenol-based resin is obtained by a reaction of (a) a bisphenol-based compound, (b) at least one selected from the group consisting of aminobenzenesulfonic acids and aminobenzenesulfonic acid derivatives, and (c) at least one selected from the group consisting of formaldehyde and formaldehyde derivatives, wherein a content of a structural unit that is obtained by the reaction of the component (a), the component (b) and the component (c) and also has a benzoxazine ring is 15 mass % or less. A production method for the electrode is also disclosed.

20 Claims, 5 Drawing Sheets

(51) Int. Cl.
*C08G 14/06* (2006.01)
*H01M 10/06* (2006.01)
*H01M 4/20* (2006.01)

(56) References Cited

FOREIGN PATENT DOCUMENTS

| JP | H10-001344 A | 1/1998 |
| JP | 2009-019079 A | 1/2009 |
| WO | 97/037393 A1 | 10/1997 |
| WO | 2013/031263 A1 | 3/2013 |
| WO | 2015/064445 A1 | 5/2015 |

OTHER PUBLICATIONS

International Preliminary Report on Patentability of WO Appln. No. PCT/JP2015/060883 dated Oct. 20, 2016 in English.
EP Search Report of Appln. No. 15 77 7517.2 dated Aug. 8, 2017 in English.

* cited by examiner

BISPHENOL-BASED RESIN, ELECTRODE, LEAD STORAGE BATTERY, PRODUCTION METHODS FOR THESE, AND RESIN COMPOSITION

CROSS-REFERENCE TO A RELATED APPLICATION

This application is a continuation-in-part of prior application Ser. No. 15/302,917, having a 371 (c) date of Oct. 7, 2016, which is 371 National Stage Entry of PCT/JP2015/060883, filed Apr. 7, 2015, which claims benefit of the filing date of Japanese application no. JP 2014-079550, filed Apr. 8, 2014, the contents of each of which are incorporated herein by reference in their entireties.

TECHNICAL FIELD

The present invention relates to a bisphenol-based resin, a resin composition, an electrode, a lead storage battery, and production methods for these.

BACKGROUND ART

A lead storage battery for automobiles is widely used for starting an engine, and for supplying an electric power to electronic auto parts. In recent years, an idling stop system (which will be referred to as "ISS", hereafter), which stops the engine when the vehicle temporarily stops, and restarts when the vehicle starts, is coming to be employed as a measure of environmental protection and a fuel consumption improvement. In a lead storage battery that is used in ISS, the number of times of discharging a large current when the engine starts increases because the start and the stop of the engine is frequently repeated, then, it combines with the use of the electronic auto parts to thereby cause discharge loads to become heavy.

The lead storage battery for automobiles is charged by an alternator with a constant-potential charging. In recent years, the set value of the alternator voltage is lowering for the purpose of suppressing the decrease of the electrolytic solution due to an electrolysis of water during charging. In recent years, in addition to the adoption of such a low charge voltage, the so-called power generation control system which is the method of "controlling the charge by the alternator during running according to the running state of vehicles and the charging state of the lead storage battery, to thereby reduce the engine load to aim at improvement in fuel consumption and $CO_2$ reduction" is also adopted. In such a method, the lead storage battery is not easily charged and is therefore unlikely to become a fully charged state. On such a working condition, the lead storage battery becomes often used in a state of being not fully charged and being excessively discharged.

If the lead storage battery has not been completely charged and a state of low charging level is continued, there is a case where a phenomenon "sulfation" occurs, in which lead sulfate, which is an inactive discharge product, accumulates on a polar plate. It is known that in such a situation, an active material is not easily reduced (it is not easily charged), and that accordingly the battery performance such as the cycle characteristics is lowered.

In addition, when complete charging is not easily performed, a stratification phenomenon occurs, in which a difference in the concentration of dilute sulfuric acid, which is an electrolytic solution, arises between an upper part and a lower part of the polar plate in the lead storage battery. In this case, the concentration of dilute sulfuric acid becomes high in the lower part of the polar plate, and therefore, the sulfation occurs. Because of this, the reactivity at the lower part of the polar plate is lowered and only the upper part of the polar plate becomes to react intensively. As a result, a degradation progresses, for example, the connection between active materials becomes weak, and thus the active material in the upper part of the polar plate exfoliates from the current collector (for example, current collecting grid), which supports the active material, to thereby lower the battery performance such as the cycle characteristics.

In these circumstances, the following Patent Literature 1 discloses, as means for improving the cycle characteristics and the like, the technique concerning a negative electrode for the lead storage battery obtained with the use of a negative electrode active material, and a condensate of phenols, an aminobenzenesulfonic acid and formaldehyde.

CITATION LIST

Patent Literature

Patent Literature 1: International publication No. WO 1997/37393

SUMMARY OF INVENTION

Technical Problem

By the way, it is required for a material for obtaining an electrode of the lead storage battery to improve the storage stability as compared with the prior art.

The present invention has been made in the above described circumstances, and an object of the present invention is to provide a bisphenol-based resin that is excellent in the storage stability, and a production method for the same. In addition, another object of the present invention is to provide a resin composition that contains the above described bisphenol-based resin. Furthermore, still another object of the present invention is to provide an electrode and a lead storage battery that are produced with the use of the above described bisphenol-based resin, and production methods for these.

Solution to Problem

A bisphenol-based resin of the present invention is obtained by a reaction of (a) a bisphenol-based compound, (b) at least one selected from the group consisting of aminobenzenesulfonic acids and aminobenzenesulfonic acid derivatives, and (c) at least one selected from the group consisting of formaldehyde and formaldehyde derivatives, wherein a content of a structural unit that is obtained by the reaction of the component (a), the component (b) and the component (c) and also has a benzoxazine ring is 15 mass % or less.

The bisphenol-based resin of the present invention can improve the storage stability of a bisphenol-based conventional resin as compared with the prior art, and can obtain the excellent storage stability. Factors of the thus improved storage stability is considered as follows: the benzoxazine ring in the structural unit which is obtained by the reaction of the component (a), the component (b) and the component (c) and also has the benzoxazine ring causes ring-opening polymerization to thereby increase the molecular weight, which contributes to degradation in the storage stability; and therefore, the storage stability is improved by decreasing the content of such a structural unit. However, the factors are not limited to these.

In addition, the present inventors have made an extensive investigation, and as a result, it has become clear that the sufficient cycle characteristics are not obtained when the negative electrode for the lead storage battery described in Patent Literature 1 is used. In contrast to this, by using the bisphenol-based resin of the present invention, it is possible to obtain the excellent cycle characteristics in the lead storage battery. In addition, the bisphenol-based resin of the present invention can satisfactory balance an excellent battery performance such as the charge acceptablity, the discharge characteristics and the cycle characteristics.

The factors of the excellent cycle characteristics as described above is considered as follows: in the lead storage battery obtained by using the above described bisphenol-based resin, coarsening of the reactant, which is generated in an electrode reaction of the lead storage battery, is suppressed, and thereby a specific surface area of the electrode is kept high. In addition, the improved storage stability of the bisphenol-based resin also contribute to the excellent cycle characteristics. However, the factors are not limited to these.

The above described structural unit having the benzoxazine ring of the bisphenol-based resin of the present invention may be a structural unit represented by the following general formula (I):

[Chemical Formula 1]

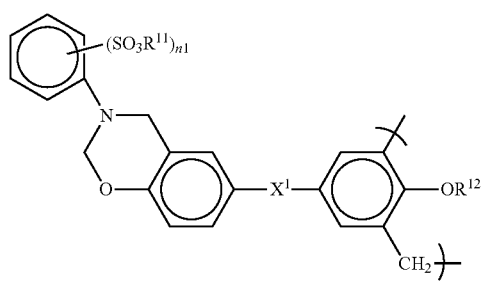

(I)

[In formula (I), $X^1$ represents a divalent group; $R^{11}$ and $R^{12}$ each independently represent an alkali metal or a hydrogen atom; n1 represents an integer of 1 to 3; and a hydrogen atom that is directly bonded to a carbon atom constituting a benzene ring may be substituted with an alkyl group or a methylol group.]

A weight average molecular weight of the bisphenol-based resin of the present invention is preferably 30000 to 70000. In this case, the further excellent cycle characteristics can be obtained.

A resin composition of the present invention contains the bisphenol-based resin of the present invention. The resin composition of the present invention can improve the storage stability of the resin composition as compared with the prior art, and can obtain the excellent storage stability.

A nonvolatile matter content of the resin composition of the present invention is preferably 10 to 50 mass %. In this case, the solubility of the bisphenol-based resin is excellent, and the further excellent battery performance can be obtained.

The electrode of the present invention is produced by using the bisphenol-based resin of the present invention or the resin composition of the present invention. The lead storage battery of the present invention has the electrode of the present invention. Also in these cases, the excellent cycle characteristics can be obtained.

The production method for the bisphenol-based resin of the present invention comprises: a step of reacting (a) a bisphenol-based compound, (b) at least one selected from the group consisting of aminobenzenesulfonic acids and aminobenzenesulfonic acid derivatives, and (c) at least one selected from the group consisting of formaldehyde and formaldehyde derivatives, to obtain a bisphenol-based resin, wherein a content of a structural unit that is obtained by the reaction of the component (a), the component (b) and the component (c) and also has a benzoxazine ring is 15 mass % or less based on the total mass of the bisphenol-based resin.

The production method for the bisphenol-based resin of the present invention can improve the storage stability of the bisphenol-based resin as compared with the prior art, and can obtain the excellent storage stability. In addition, the production method for the bisphenol-based resin of the present invention can obtain the excellent cycle characteristics in the lead storage battery. Furthermore, the production method for the bisphenol-based resin of the present invention can satisfactory balance an excellent battery performance such as the charge acceptability, the discharge characteristics and the cycle characteristics.

In the production method for the bisphenol-based resin of the present invention, the above described structural unit having the benzoxazine ring of the above described bisphenol-based resin may be a structural unit represented by the following general formula (I):

[Chemical Formula 2]

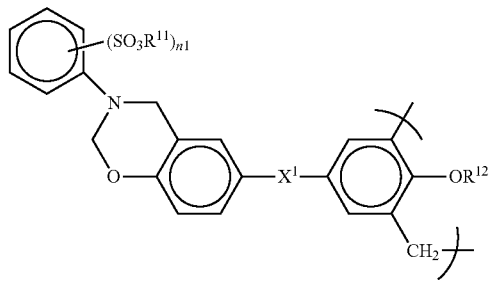

(I)

[In formula (I), $X^1$ represents a divalent group; $R^{11}$ and $R^{12}$ each independently represent an alkali metal or a hydrogen atom; n1 represents an integer of 1 to 3; and a hydrogen atom that is directly bonded to a carbon atom constituting a benzene ring may be substituted with an alkyl group or a methylol group.]

In a preferable embodiment of the production method for the bisphenol-based resin of the present invention, the amount of the component (b) is 0.5 to 1.3 mol with respect to 1 mol of the component (a), and the amount of the component (c) is 2 to 3.5 mol in terms of formaldehyde with respect to 1 mol of the component (a). In this case, the further excellent cycle characteristics can be obtained.

A production method for an electrode of the present invention comprises a step of producing an electrode by using the bisphenol-based resin obtained by the production method for the bisphenol-based resin of the present invention. A production method for a lead storage battery of the present invention comprises a step of obtaining the electrode by the production method for the electrode of the present invention. Also in these cases, the excellent cycle characteristics can be obtained.

Advantageous Effects of Invention

The present invention can obtain the bisphenol-based resin and the resin composition that have the excellent storage stability. In addition, the present invention can obtain the excellent cycle characteristics in the lead storage battery. Furthermore, the present invention can satisfactory balance an excellent battery performance such as the charge acceptability, the discharge characteristics and the cycle characteristics.

The present invention can provide an application of the bisphenol-based resin to the lead storage battery, and an application of the resin composition to the lead storage battery. In particular, the present invention can obtain excellent characteristics in a lead storage battery that has a negative electrode produced by using the above described bisphenol-based resin or the above described resin composition. The present invention can provide an application of the bisphenol-based resin to the negative electrode of the lead storage battery, and application of the resin composition to the negative electrode of the lead storage battery.

The present invention can provide an application of the bisphenol-based resin to the lead storage battery in automobiles, and an application of the resin composition to the lead storage battery in automobiles. In addition, the present invention can provide the lead storage battery that can be sufficiently satisfied in use for an ISS vehicle which is used in a severe environment, because of being excellent in the charge acceptability. The present invention can provide an application of the bisphenol-based resin to the lead storage battery in the ISS vehicle, and an application of the resin composition to the lead storage battery in the ISS vehicle.

DESCRIPTION OF EMBODIMENTS

Figure 1:
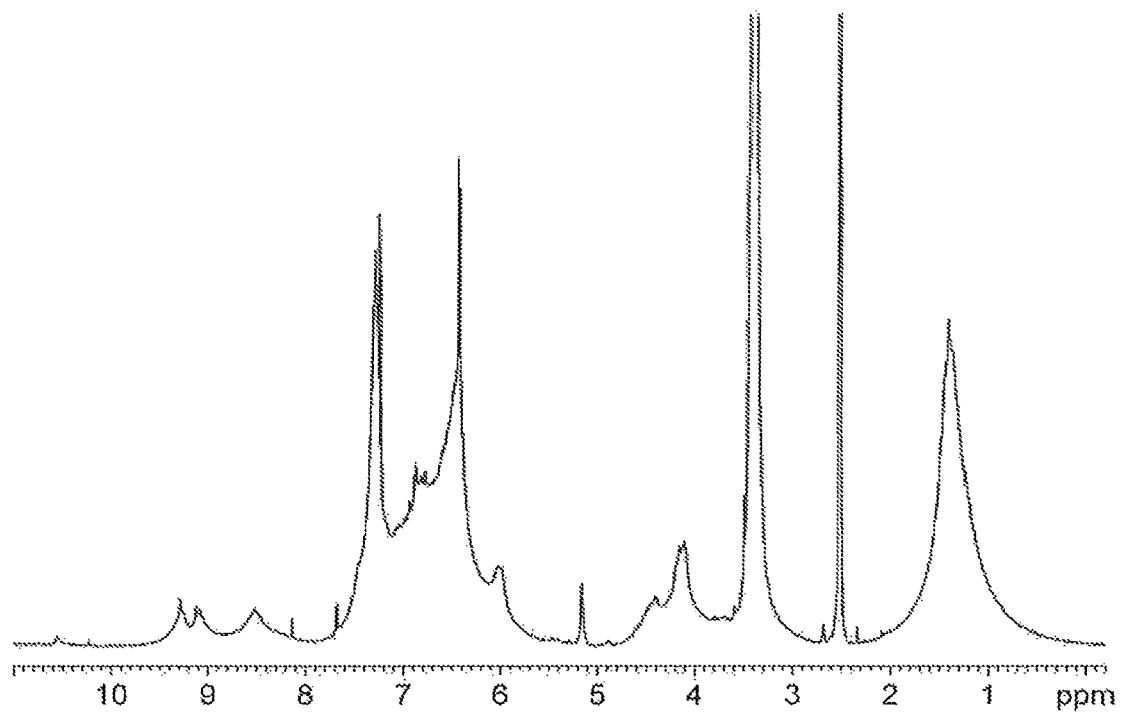
FIG. 1 is a view showing a measurement result of $^1$H-NMR spectrum of a bisphenol-based resin.

Embodiments of the present invention will be described in detail below.

<Bisphenol-Based Resin, Resin Composition, and Production Methods for these>

A bisphenol-based resin of the present embodiment is obtained by a reaction of (a) a bisphenol-based compound (hereinafter occasionally referred to as component (a)), (b) at least one selected from the group consisting of aminobenzenesulfonic acids and aminobenzenesulfonic acid derivatives (hereinafter occasionally referred to as component (b)), and (c) at least one selected from the group consisting of formaldehyde and formaldehyde derivatives (hereinafter occasionally referred to as component (c)). In the bisphenol-based resin of the present embodiment, a content (percentage) of a structural unit that is obtained by the reaction of the component (a), the component (b) and the component (c) and also has a benzoxazine ring is 15 mass % or less based on the total mass of the bisphenol-based resin.

The resin composition of the present embodiment contains the bisphenol-based resin of the present embodiment. The resin composition of the present embodiment is a composition that contains, for example, a bisphenol-based resin and a solvent (water or the like), and is a liquid resin solution at 25° C., for example. Components for obtaining the bisphenol-based resin, components of the resin composition, and the like will be described below. When a plurality of substances corresponding to a component exists, the content of the component herein means the total amount of the plurality of existing substances, unless otherwise specifically indicated.

(Component (a): Bisphenol-Based Compound)

The bisphenol-based compound is a compound having two hydroxyphenyl groups. Examples of the bisphenol-based compound includes 2,2-bis(4-hydroxyphenyl)propane (hereinafter referred to as "bisphenol A"), bis(4-hydroxyphenyl)methane, 1,1-bis(4-hydroxyphenyl)ethane, 2,2-bis(4-hydroxyphenyl)hexafluoropropane, 1,1-bis(4-hydroxyphenyl)-1-phenylethane, 2,2-bis(4-hydroxyphenyl)butane, bis(4-hydroxyphenyl)diphenylmethane, 1,1-bis(4-hydroxyphenyl)cyclohexane, 1,1-bis(4-hydroxyphenyl)-3,3,5-trimethylcyclohexane, and bis(4-hydroxyphenyl)sulfone (hereinafter referred to as "bisphenol S"). These can be used singly or in combinations of two or more. As for the bisphenol-based compound, bisphenol A is preferable in view of the further excellent charge acceptability, and bisphenol S is preferable in view of the further excellent discharge characteristics.

As for the bisphenol-based compound, it is preferable to use the bisphenol A and the bisphenol S together, in view of improving the charge acceptability, the discharge characteristics and the cycle characteristics in a well-balanced manner. In this case, the amount of the bisphenol A in the reaction for obtaining the bisphenol-based resin is preferably 70 mol % or more, more preferably 75 mol % or more, and further preferably 80 mol % or more, based on the total amount of the bisphenol A and the bisphenol S, in view of improving the charge acceptability, the discharge characteristics and the cycle characteristics in a well-balanced manner. The amount of the bisphenol A is preferably 99 mol % or less, more preferably 98 mol % or less, and further preferably 97 mol % or less, based on the total amount of the bisphenol A and the bisphenol S, in view of improving the charge acceptability, the discharge characteristics and the cycle characteristics in a well-balanced manner.

(Component (b): Aminobenzenesulfonic Acid and Aminobenzenesulfonic Acid Derivative)

Examples of the aminobenzenesulfonic acids include 2-aminobenzenesulfonic acid (also known as orthanilic acid), 3-aminobenzenesulfonic acid (also known as metanilic acid), and 4-aminobenzenesulfonic acid (also known as sulfanilic acid).

Examples of the aminobenzenesulfonic acid derivatives include a compound formed by replacing part of a hydrogen atom of the aminobenzenesulfonic acid with an alkyl group (for example, alkyl group having 1 to 5 carbon atoms), and a compound formed by replacing a hydrogen atom of a sulfonic group (—$SO_3H$) of the aminobenzenesulfonic acid with an alkali metal (for example, sodium or potassium). Examples of the compounds formed by replacing part of hydrogen atoms of the aminobenzenesulfonic acid with an alkyl group include 4-(methylamino) benzenesulfonic acid, 3-methyl-4-aminobenzenesulfonic acid, 3-amino-4-methylbenzene sulfonic acid, 4-(ethylamino) benzenesulfonic acid, and 3-(ethylamino)-4-methylbenzene sulfonic acid. Examples of the compounds formed by replacing the hydrogen atom of the sulfonic group of the aminobenzenesulfonic acid with an alkali metal include sodium 2-aminobenzenesulfonate, sodium 3-aminobenzenesulfonate, sodium 4-aminobenzenesulfonate, potassium 2-aminobenzenesulfonate, potassium 3-aminobenzenesulfonate, and potassium 4-aminobenzenesulfonate.

The component (b) can be used singly or in combinations of two or more. 4-aminobenzenesulfonic acid is preferable as the component (b), in view of further improving the charge acceptability and the cycle characteristics.

The amount of the component (b) in the reaction for obtaining the bisphenol-based resin is preferably 0.5 mol or more, more preferably 0.6 mol or more, further preferably 0.8 mol or more, and particularly preferably 0.9 mol % or more, with respect to 1 mol of the component (a), in view of further improving the discharge characteristics. The amount of the component (b) is preferably 1.3 mol or less, more preferably 1.2 mol or less, and further preferably 1.1 mol or less, with respect to 1 mol of the component (a), in view of easiness to further improving the discharge characteristics and the cycle characteristics.

(Component (c): Formaldehyde and Formaldehyde Derivative)

Formaldehyde in formalin (for example, aqueous solution of 37 mass % of formaldehyde) may be used as formaldehyde. Examples of the formaldehyde derivatives include paraformaldehyde, hexamethylenetetramine, and trioxane. The component (c) can be used singly or in combinations of two or more. Formaldehyde and a formaldehyde derivative may be used together.

Formaldehyde derivatives are preferable as the component (c), and paraformaldehyde is more preferable, in view of easiness to obtain the excellent cycle characteristics. The paraformaldehyde has, for example, the following structure:

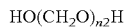
(II)

[In formula (II), n2 represents an integer of 2 to 100.]

The amount of the component (c) in terms of formaldehyde in the reaction for obtaining the bisphenol-based resin is preferably 2 mol or more, more preferably 2.2 mol or more, and further preferably 2.4 mol or more, with respect to 1 mol of the component (a), in view of improving the reactivity of the component (b). The amount of the component (c) in terms of formaldehyde is preferably 3.5 mol or less, more preferably 3.2 mol or less, further preferably 3 mol or less, particularly preferably less than 2.8 mol, and extremely preferably 2.5 mol or less, with respect to 1 mol of the component (a), in view of easiness to decrease the structural unit that is obtained by the reaction of the component (a), the component (b) and the component (c) and also has the benzoxazine ring.

(Other Component)

The resin composition of the present embodiment may contain a solvent. Examples of the solvents include water (for example, ion exchanged water), and an organic solvent. The solvent contained in the resin composition may be a reaction solvent which is used for obtaining the bisphenol-based resin.

The resin composition of the present embodiment may further contain a natural resin or a synthetic resin other than the bisphenol-based resin.

The bisphenol-based resin of the present embodiment preferably has, for example, at least one of a structural unit represented by the following general formula (III) and a structural unit represented by the following general formula (IV).

[Chemical Formula 3]

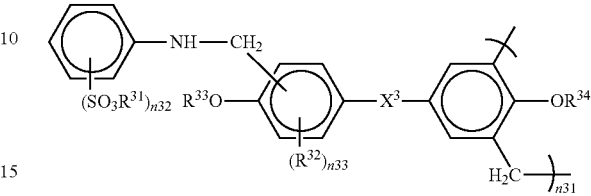

[In formula (III), $X^3$ represents a divalent group; $R^{31}$, $R^{33}$ and $R^{34}$ each independently represent an alkali metal or a hydrogen atom; $R^{32}$ represents a methylol group ($-CH_2OH$); n31 represents an integer of 1 to 300; n32 represents an integer of 1 to 3; n33 represents 0 or 1. Also, the hydrogen atom that is directly bonded to the carbon atom constituting the benzene ring may be substituted with an alkyl group having 1 to 5 carbon atoms.]

[Chemical Formula 4]

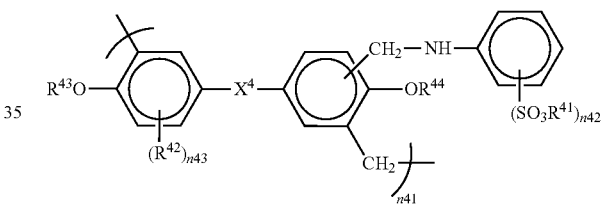

[In formula (IV), $X^4$ represents a divalent group; $R^{41}$, $R^{43}$ and $R^{44}$ each independently represent an alkali metal or a hydrogen atom; $R^{42}$ represents a methylol group ($-CH_2OH$); n41 represents an integer of 1 to 300; n42 represents an integer of 1 to 3; n43 represents 0 or 1. Also, the hydrogen atom that is directly bonded to the carbon atom constituting the benzene ring may be substituted with an alkyl group having 1 to 5 carbon atoms.]

A ratio between the structural unit represented by the formula (III) and the structural unit represented by the formula (IV) is not limited in particular, and can vary depending on the synthetic condition or the like. A resin that has only either one of the structural unit represented by the formula (III) and the structural unit represented by the formula (IV) may be used for the bisphenol-based resin.

Examples of $X^3$ and $X^4$ include an organic group such as an alkylidene group (for example, methylidyne group, ethylidene group, isopropylidene group and sec-butylidene group), a cycloalkylidene group (for example, cyclohexylidene group), and a phenylalkylidene group (for example, diphenylmethylidene group and phenylethylidene group); and a sulfonyl group: and the isopropylidene group ($-C(CH_3)_2-$) group is preferable in view of the further excellent charge acceptability, and the sulfonyl group ($-SO_2-$) is preferable in view of the further excellent discharge characteristics. $X^3$ and $X^4$ may be substituted with a halogen atom such as a fluorine atom. When $X^3$ or $X^4$ is the cycloalkylidene group, the hydrocarbon ring may be substituted with an alkyl group or the like.

Examples of alkali metals of $R^{31}$, $R^{33}$, $R^{34}$, $R^{41}$, $R^{43}$ and $R^{44}$ include sodium and potassium. n31 and n41 are preferably 50 to 150, in view of the further excellent cycle characteristics and solubility to the solvent. n32 and n42 are preferably 1 or 2, and more preferably 1, in view of improving the charge acceptability, the discharge characteristics and the cycle characteristics in a well-balanced manner. n33 and n43 varies depending on the production condition, but n33 and n43 is preferably 0, in view of the further excellent cycle characteristics and storage stability.

There is a case where the structural unit that is obtained by the reaction of the component (a), the component (b) and the component (c) and also has a benzoxazine ring is included in the bisphenol-based resin of the present embodiment, depending on the synthetic condition. Such a structural unit having the benzoxazine ring includes, for example, a structural unit that has one bisphenol structure derived from the component (a) and one benzene ring derived from the component (b), and also includes a structural unit represented by the following general formula (I). In such a structural unit, for example, the benzoxazine ring is obtained by the reaction of the component (a), the component (b) and the component (c).

[Chemical Formula 5]

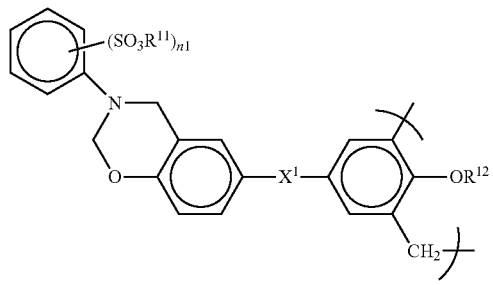

(I)

[In formula (I), $X^1$ represents a divalent group; $R^{11}$ and $R^{12}$ each independently represent an alkali metal or a hydrogen atom; n1 represents an integer of 1 to 3. Also, a hydrogen atom that is directly bonded to the carbon atom constituting the benzene ring may be substituted with an alkyl group (alkyl group having 1 to 5 carbon atoms) or a methylol group.]

Examples of $X^1$ include divalent groups that have been illustrated as $X^3$ and $X^4$ above described. Examples of the alkali metals of $R^{11}$ and $R^{12}$ include sodium and potassium.

In the bisphenol-based resin of the present embodiment, a content of a structural unit that is obtained by the reaction of the component (a), the component (b) and the component (c) and also has the benzoxazine ring is 15 mass % or less based on the total mass of the bisphenol-based resin, in view of obtaining the excellent storage stability. The content of the above described structural unit is preferably 8 mass % or less, and more preferably 6 mass % or less, based on the total mass of the bisphenol-based resin, in view of the further excellent storage stability and cycle characteristics. The content of the above described structural unit may be 0 mass % based on the total mass of the bisphenol-based resin, the smaller content is preferable. The content of the above described structural unit can be calculated, for example, from a ratio of a peak integral value at 5.2 to 5.8 ppm, which originates in the benzoxazine ring, to a peak integral value at 0.1 to 2.3 ppm, which originates in the methyl group of the bisphenol A in a $^1$H-NMR spectrum. The content of the above described structural unit can be adjusted by the amount of the component (c), a reaction temperature and a reaction time in the synthetic reaction of the bisphenol-based resin, and the like.

The reason why the structural unit represented by the formula (I) is generated is considered as follows: the component (c) exists in an excessive amount, and therefore, a phenolic hydroxyl group of the component (b) and an ortho position (o-position) of the benzene ring of the component (b) cause a ring-closing reaction through a dimethyleneamine group ($-CH_2NHCH_2-$). The structural unit represented by the formula (I) is a factor of the low storage stability, because the benzoxazine ring causes ring-opening polymerization to thereby increase the molecular weight.

The weight average molecular weight of the bisphenol-based resin of the present embodiment is preferably 30000 or more, more preferably 35000 or more, further preferably 40000 or more, and particularly preferably 50000 or more, in view of suppressing the elution of the bisphenol-based resin from the electrode to an electrolytic solution in the lead storage battery to thereby easily improve the cycle characteristics. The weight average molecular weight of the bisphenol-based resin is preferably 70000 or less, more preferably 65000 or less, and further preferably 62000 or less, in view of suppressing the lowering of adsorptivity to an electrode active material to thereby easily improve the cycle characteristics.

The weight average molecular weight of the bisphenol-based resin can be measured, for example, by gel permeation chromatography (hereinafter referred to as "GPC") on the following conditions.

(GPC Condition)

Apparatus: High performance liquid chromatograph LC-2200 Plus (made by JASCO Corporation)

Pump: PU-2080

Differential refractometer: RI-2031

Detector: Ultraviolet visible absorptiometer UV-2075 (X: 254 nm)

Column oven: CO-2065

Column: TSKgel SuperAW (4000), TSKgel SuperAW (3000) and TSKgel SuperAW (2500) (made by Tosoh Corporation)

Column temperature: 40° C.

Eluent: Methanol solution containing LiBr (10 mM) and triethylamine (200 mM)

Flow velocity: 0.6 mL/minute

Molecular weight standard sample: polyethylene glycol (molecular weight: $1.10 \times 10^6$, $5.80 \times 10^5$, $2.55 \times 10^5$, $1.46 \times 10^5$, $1.01 \times 10^5$, $4.49 \times 10^4$, $2.70 \times 10^4$ and $2.10 \times 10^4$; made by Tosoh Corporation), diethylene glycol (molecular weight: $1.06 \times 10^2$; made by Kishida Chemical Co., Ltd.), and dibutylhydroxytoluene (molecular weight: $2.20 \times 10^2$; made by Kishida Chemical Co., Ltd.)

There is a case where the resin composition of the present embodiment contains a compound (monomer; a compound having molecular weight of, for example, 500 or less) which is obtained by a reaction of the component (a), the component (b) and the component (c) and also has a benzoxazine ring, in addition to the bisphenol-based resin of the present embodiment. Examples of such compounds include a compound that has a structural unit represented by the following general formula (V):

[Chemical Formula 6]

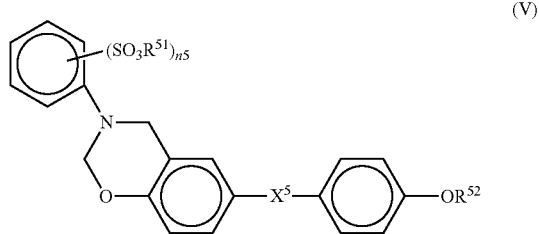

(V)

[In formula (V), $X^5$ represents a divalent group; $R^{51}$ and $R^{52}$ each independently represent an alkali metal or a hydrogen atom; n5 represents an integer of 1 to 3. Also, a hydrogen atom that is directly bonded to the carbon atom constituting the benzene ring may be substituted with an alkyl group (for example, alkyl group having 1 to 5 carbon atoms) or a methylol group.]

Examples of $X^5$ include divalent groups that have been illustrated as $X^3$ and $X^4$ above described. Examples of the alkali metals of $R^{51}$ and $R^{52}$ include sodium and potassium. The reason why the compound having the structural unit represented by the formula (V) is generated is considered to be similar to the reason why the structural unit represented by the formula (I) is generated. In addition, the compound having the structural unit represented by the formula (V) is a factor of the low storage stability, because the benzoxazine ring causes ring-opening polymerization to thereby increase the molecular weight.

In the resin composition of the present embodiment, a content of a structural unit which is obtained by the reaction of the component (a), the component (b) and the component (c) and also has the benzoxazine ring is preferably 15 mass % or less based on the total mass of the nonvolatile matter in the resin composition, in view of obtaining the further excellent cycle characteristics and storage stability. The above described content is more preferably 8 mass % or less, and further preferably 6 mass % or less, based on the total mass of the nonvolatile matter in the resin composition, in view of the further excellent storage stability of the resin composition and the further excellent cycle characteristics. When 70 mol % or more of bisphenol A is contained as the component (a), the above described content can be calculated, for example, from a ratio of a peak integral value at 5.2 to 5.8 ppm, which originates in the benzoxazine ring, to a peak integral value at 0.1 to 2.3 ppm, which originates in the methyl group of the bisphenol A, in a $^1$H-NMR spectrum.

In the resin composition of the present embodiment, the contents (total amount) of the structural unit represented by the formula (I) and the structural unit represented by the formula (V) is preferably 15 mass % or less based on the total mass of the nonvolatile matter in the resin composition, in view of obtaining the further excellent cycle characteristics and storage stability. The above described content is preferably 15 mass % or less, more preferably 8 mass % or less, and further preferably 6 mass % or less, based on the total mass of the nonvolatile matter in the resin composition, in view of the further excellent storage stability of the resin composition and the further excellent cycle characteristics.

The content of the bisphenol-based resin in the resin composition of the present embodiment is preferably 70 mass % or more, more preferably 80 mass % or more, and further preferably 90 mass % or more, based on the total mass of the nonvolatile matter in the resin composition, in view of improving the charge acceptability, the discharge characteristics and the cycle characteristics in a well-balanced manner.

The nonvolatile matter content in the resin composition of the present embodiment is preferably 10 mass % or more, more preferably 15 mass % or more, and further preferably 20 mass % or more, in view of the further excellent solubility of the bisphenol-based resin and the further excellent battery characteristics. From the same viewpoint, the nonvolatile matter content in the resin composition of the present embodiment is preferably 50 mass % or less, more preferably 45 mass % or less, and further preferably 40 mass % or less.

The nonvolatile matter content can be measured, for example, by the following procedure. Firstly, a predetermined amount (for example, 2 g) of the resin composition is placed in a container (for example, metallic petri dish such as stainless steel petri dish), and then the resin composition is dried at 150° C. for 60 minutes with the use of a hot-air drier. Next, after the temperature of the container has returned to room temperature (for example, 25° C.), a residual mass is measured. The nonvolatile matter content is calculated from the following expression.

Nonvolatile matter content (mass %)=[(residual mass after drying)/(mass of resin composition before drying)]×100

The production method for the bisphenol-based resin of the present embodiment comprises a resin production step of reacting the component (a), the component (b) and the component (c) to obtain a bisphenol-based resin. The resin composition of the present embodiment may be a composition obtained in the resin production step, and may also be a composition obtained by mixing the bisphenol-based resin and other components after the resin production step.

The bisphenol-based resin can be obtained, for example, by reacting the component (a), the component (b) and the component (c) in a reaction solvent. The reaction solvent is preferably water (for example, ion exchanged water). In order to promote the reaction, an organic solvent, a catalyst, an additive or the like may be used.

In view of further improving the cycle characteristics, in a preferable embodiment of the resin production step, the amount of the component (b) is 0.5 to 1.3 mol with respect to 1 mol of the component (a), and the amount of the component (c) is 2 to 3.5 mol in terms of formaldehyde with respect to 1 mol of the component (a); and in a more preferable embodiment, the amount of the component (b) is 0.5 to 1.3 mol with respect to 1 mol of the component (a), and the amount of the component (c) is 2 to 2.5 mol in terms of formaldehyde with respect to 1 mol of the component (a). The preferable amount of each of the component (b) and the component (c) is in the range described above for each of the amounts of the component (b) and the component (c).

It is preferable to obtain the bisphenol-based resin of the present embodiment by reacting the component (a), the component (b) and the component (c) under the basic condition (alkaline condition), in view of easily obtaining a sufficient amount of the bisphenol-based resin. A basic compound may be used for the adjustment of the basic condition. Examples of the basic compounds include sodium hydroxide, potassium hydroxide, calcium hydroxide, magnesium hydroxide, and sodium carbonate. The basic compounds can be used singly or in combinations of two or more. Among the basic compounds, the sodium hydroxide and the potassium hydroxide are preferable, in view of excellent reactivity.

When the reaction solution at the time of reaction is neutral (pH=7), there is a case where the production reaction of the bisphenol-based resin does not easily progress, and when the reaction solution is acidic (pH<7), there is a case where a side reaction (for example, production reaction of structural unit having benzoxazine ring) progresses. Because of this, the pH of the reaction solution at the time of reaction is preferably alkaline (over 7), more preferably 7.1 or higher, and further preferably 7.2 or higher, in view of easiness to suppress the progress of the side reaction while progressing the production reaction of the bisphenol-based resin. The pH of the reaction solution is preferably 12 or lower, more preferably 10 or lower, and further preferably 9 or lower, in view of suppressing the progress of hydrolysis of a group derived from the component (b) of the bisphenol-based resin. The pH of the reaction solution can be measured, for example, with a twin pH meter AS-212 made by Horiba, Ltd. The pH is defined as a pH at 25° C.

The amount of the strongly basic compound is preferably 1.01 mol or more, more preferably 1.02 mol or more, and further preferably 1.03 mol or more, with respect to 1 mol of the component (b), because of easiness of the adjustment to the above described pH. From the same viewpoint, the amount of the strongly basic compound is preferably 1.1 mol or less, more preferable 1.08 mol or less, and further preferably 1.07 mol or less, with respect to 1 mol of the component (b). Examples of the strongly basic compounds include sodium hydroxide and potassium hydroxide.

In the present embodiment, a reactant (reaction solution) obtained by a production method for the bisphenol-based resin may be used as it is, for a production of an electrode described later, or the bisphenol-based resin obtained by drying the reactant may be dissolved in a solvent (water or the like), and then used for the production of the electrode described later.

The pH of the resin composition (for example, liquid resin solution at 25° C.) is preferably alkaline (over 7), and more preferably 7.1 or more, in view of the excellent solubility of the bisphenol-based resin to the solvent (water or the like). The pH of the resin composition is preferably 10 or less, more preferably 9 or less, and further preferably 8.5 or less, in view of further improving the storage stability of the resin composition. In particular, when the composition obtained in the resin production step is used as the resin composition, the pH of the resin composition is preferably in the above described range. The pH of the resin composition can be measured, for example, with a twin pH meter AS-212 made by Horiba, Ltd. The pH is defined as a pH at 25° C.

In the synthetic reaction of the bisphenol-based resin, the component (a), the component (b) and the component (c) can react to obtain the bisphenol-based resin, for example, the component (a), the component (b) and the component (c) may be allowed to simultaneously react, alternatively, two components out of the component (a), the component (b) and the component (c) may be allowed to react, followed by reacting the remaining one component.

It is preferable to carry out the synthetic reaction of the bisphenol-based resin in the following two steps. In a reaction of the first step, for example, the component (b), a solvent (water or the like) and a basic compound are placed and then stirred to substitute the hydrogen atom of the sulfonic group in the component (b) with the alkali metal or the like, to obtain an alkali metal salt of the component (b) or the like. Thereby, it is easy to suppress the side reaction in a condensation reaction described later. The temperature of the reaction system is preferably 0° C. or higher, and more preferably 25° C. or higher, in view of the excellent solubility of the component (b) to the solvent (water or the like). The temperature of the reaction system is preferably 80° C. or lower, more preferably 70° C. or lower, and further preferably 65° C. or lower, in view of easiness to suppress the side reaction. The reaction time is, for example, 30 minutes.

In a reaction of the second step, for example, the component (a) and the component (c) are added to the reactant obtained in the first step, and a condensation reaction is carried out to obtain the bisphenol-based resin. The temperature of the reaction system is preferably 75° C. or higher, more preferably 85° C. or higher, and further preferably 92° C. or higher, in view of the excellent reactivity of the component (a), component (b) and the component (c) and of further decreasing the structural unit derived from the benzoxazine ring. The temperature of the reaction system is preferably 100° C. or lower, more preferably 98° C. or lower, and further preferably 96° C. or lower, in view of easiness to suppress the side reaction. The reaction time is, for example, 5 to 20 hours.

<Electrode, Lead Storage Battery, and their Production Methods>

An electrode of the present embodiment is produced with the use of, for example, a raw material of an electrode active material, and the bisphenol-based resin of the present embodiment or a resin composition that contains the bisphenol-based resin. A production method for the electrode of the present embodiment comprises a step of producing an electrode by using the bisphenol-based resin obtained by the production method for the bisphenol-based resin of the present embodiment. In addition, the electrode of the present embodiment may be produced with the use of a resin composition containing the bisphenol-based resin. When the electrode is chemically unconverted, the electrode has, for example, an electrode layer containing a raw material of the electrode active material and the like, and the current collector supporting the electrode layer. The electrode after chemical conversion has, for example, an electrode layer containing the electrode active material and the like, and the current collector supporting the electrode layer. The electrode is, for example, a negative electrode (negative electrode plate or the like) for a lead storage battery.

A lead storage battery of the present embodiment comprises the electrode of the present embodiment. Examples of the lead storage batteries of the present embodiment include a liquid type lead storage battery, and a closed type lead storage battery; and the liquid type lead storage battery is preferable. The production method for the lead storage battery of the present embodiment comprises, for example, an electrode production step of obtaining the electrode by the production method for the electrode of the present embodiment; and an assembling step of assembling constituent members containing the electrode to obtain the lead storage battery.

In the electrode production step, for example, a chemically unconverted electrode is obtained by filling the current collector (for example, current collecting grid) with an electrode active material paste, and then aging and drying. The electrode active material paste contains, for example, a raw material of the electrode active material and the bisphenol-based resin, and may further contain other predetermined additives and the like. When the electrode is the negative electrode, the raw material of the negative electrode active material is preferably a lead powder (for example, mixture of powder of PbO and scale-like metal lead). Examples of the additives include barium sulfate, a carbon material, and a short fiber for reinforcement (acrylic fiber, polyethylene fiber, polypropylene fiber, polyethylene terephthalate fiber, carbon fiber and the like). Examples of the carbon materials include carbon black and graphite. Examples of the carbon blacks include furnace black, channel black, acetylene black, thermal black, and Ketchen black (registered trademark).

When the electrode of the present embodiment is the negative electrode, a negative electrode active material paste can be obtained, for example, by the following method. Firstly, a mixture is obtained by mixing a lead powder with the bisphenol-based resin or a resin composition containing the bisphenol-based resin, and an additive that is added as needed. Next, sulfuric acid (dilute sulfuric acid or the like) and a solvent (water or the like) are added to this mixture and kneading is performed to thereby obtain the negative electrode active material paste.

When the barium sulfate is used in the negative electrode active material paste, the amount of the barium sulfate is preferably 0.01 to 1 mass % based on the total mass of the raw material of the negative electrode active material. When the carbon material is used, the amount of the carbon material is preferably 0.2 to 1.4 mass % based on the total mass of the raw material of the negative electrode active material. The amount of the bisphenol-based resin or the resin composition containing the bisphenol-based resin of the present embodiment is preferably 0.01 to 2 mass %, more preferably 0.05 to 1 mass %, and further preferably 0.1 to 0.5 mass %, in terms of the solid resin content, based on the total mass of the raw material of the negative electrode active material.

Examples of the compositions of the current collector include a lead alloy such as a lead-calcium-tin-based alloy and a lead-antimony-arsenic-based alloy. Selenium, silver, bismuth or the like may be appropriately added to the current collector according to the application. The current collector can be obtained by forming these lead alloys into a lattice shape by a gravity casting method, an expanding method, a stamping method or the like.

The aging condition is preferably 15 to 60 hours in an atmosphere at a temperature of 35 to 85° C. and a humidity of 50 to 98 RH %. The drying condition is preferably 15 to 30 hours at a temperature of 45 to 80° C.

A positive electrode (positive electrode plate or the like) for the lead storage battery can be obtained, for example, by the following method. Firstly, the short fiber for reinforcement is added to the lead powder as the raw material of the electrode active material, and then water and dilute sulfuric acid are added thereto. kneading is performed for this to produce a positive electrode active material paste. When the positive electrode active material paste is produced, red lead ($Pb_3O_4$) may be added in view of shortening a chemical conversion time. A chemically unconverted positive electrode can be obtained by filling the current collector (current collecting grid or the like) with this positive electrode active material paste, and then aging and drying. In the positive electrode active material paste, the amount of the short fiber for reinforcement is preferably 0.005 to 0.3 mass % based on the total mass of the lead powder. The type of the current collector, the aging condition and the drying condition are almost similar to those in the case of the negative electrode.

In the assembling step, for example, the chemically unconverted negative electrode and positive electrode that have been produced as described above are alternately layered via a separator, and polar plates that have the same polarity are connected (welded or the like) to each other with a strap, to thereby obtain a polar plate group. This polar plate group is arranged in a battery case to produce a chemically unconverted battery. Next, the dilute sulfuric acid is injected into the chemically unconverted battery, and then a direct current is passed to perform the chemical conversion, and therefore, the lead storage battery is obtained. It is also possible to eliminate the dilute sulfuric acid once, and then inject the electrolytic solution. The specific gravity (in terms of 20° C.) of sulfuric acid is preferably 1.25 to 1.35.

The negative electrode active material can be obtained by aging and drying the negative electrode active material paste containing the raw material of the negative electrode active material to thereby obtain a chemically unconverted active material, and then performing a chemical conversion. The negative electrode active material after chemical conversion preferably contains a porous spongy lead (Spongy Lead). The positive electrode active material can be obtained by aging and drying the positive electrode active material paste containing the raw material of the positive electrode active material to obtain a chemically unconverted active material, and then performing a chemical conversion. The positive electrode active material after the chemical conversion contains, for example, lead dioxide.

Examples of materials of the separator include polyethylene and a glass fiber. The conditions of the chemical conversion and the specific gravity of the sulfuric acid can be adjusted according to the properties of the electrode active material. In addition, the chemical conversion treatment is not limited to be performed in the assembling step, but may be performed in the electrode production step.

Figure 3:
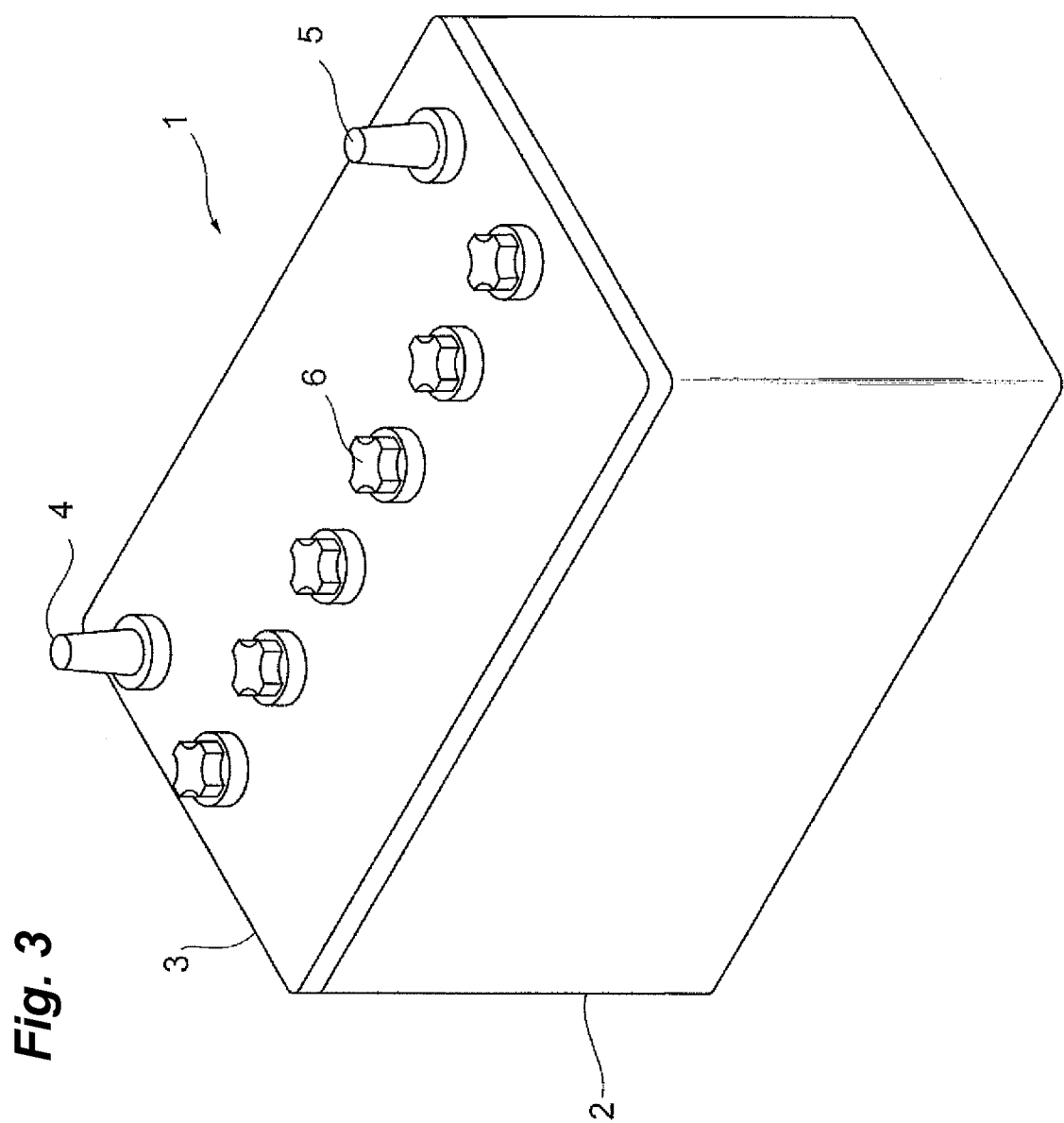
FIG. 3 is a perspective view showing one example of the lead storage battery.

FIG. 3 is a perspective view showing one example of the lead storage battery. The lead storage battery 1 shown in FIG. 3 is a liquid type lead storage battery.

Figure 4:
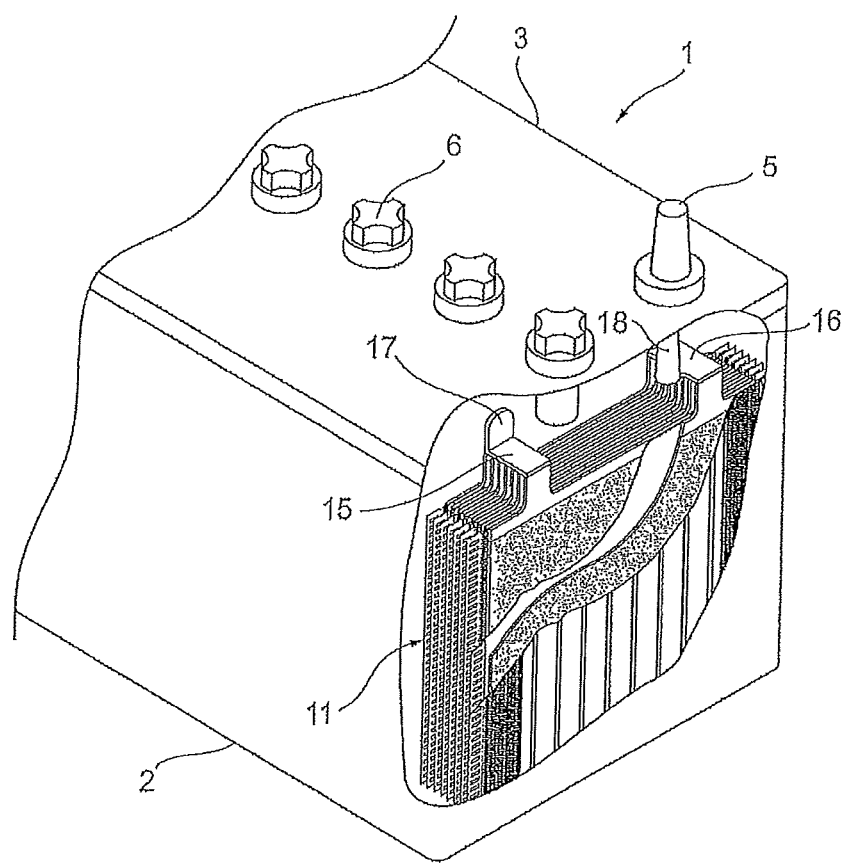
FIG. 4 is a perspective view showing a part of the internal structure of the lead storage battery.

FIG. 4 is a perspective view showing a part of the internal structure of the lead storage battery 1. The lead storage battery 1 comprises an electrolytic bath 2 and a cover 3. The upper surface of the electrolytic bath 2 has an opening and the cover 3 closes the opening of the electrolytic bath 2. An electrode plate group 11 is stored in the electrolytic bath 2. The cover 3 has a positive electrode terminal 4, a negative electrode terminal 5 and liquid vent plugs 6. The cover 3 has liquid injection ports and the liquid vent plugs 6 close the liquid injection ports. An electrolyte is stored in the electrolytic bath 2.

Figure 5:
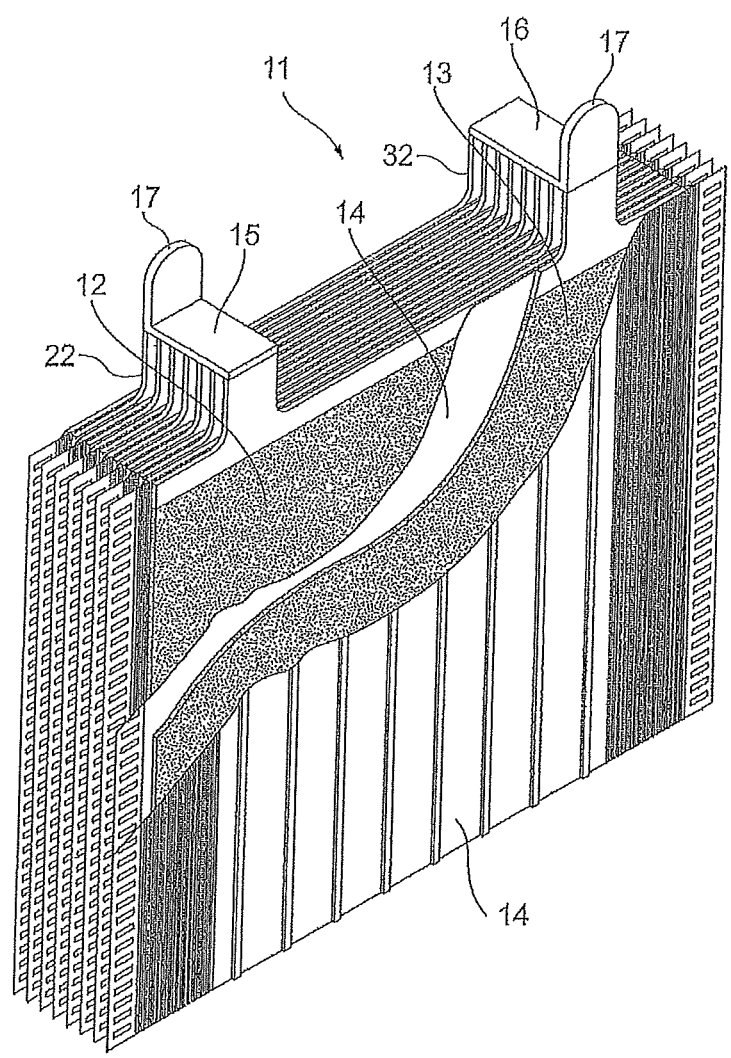
FIG. 5 is a perspective view showing one example of the electrode plate group.

The electrode plate group 11 has separators, positive electrode plates and negative electrode plates. A positive electrode plate and a negative electrode plate are alternately laminated via a separator. FIG. 5 is a perspective view showing one example of the electrode plate group. As shown in FIG. 4 and FIG. 5, the electrode plate group 11 has positive electrode plates 12, negative electrode plates 13, bag-like separators 14, a positive electrode-side strap 15, a negative electrode-side strap 16, connecting parts between cells 17, and an electrode pole 18. Current collector portions 22 and current collector portions 32 are provided at the peripheral part of the upper parts of the positive electrode plates 12 and the negative electrode plates 13.

EXAMPLE

The present invention will be specifically described below with reference to examples. However, the present invention is not limited to only the following examples.

<Preparation of Resin Solution>

Example 1

Each of the following components were placed in a reaction container having a stirring device, a refluxing device and a temperature adjustment device to obtain a first mixture liquid.

Sodium hydroxide: 1.05 mol [42.0 parts by mass]
Ion exchange water: 44.0 mol [792.6 parts by mass]
4-aminobenzenesulfonic acid: 1.00 mol [173.2 parts by mass]

The first mixture was mixed and stirred at 25° C. for 30 minutes.

Subsequently, each of the following components was added to the first mixture liquid to obtain a second mixture.
Bisphenol A: 0.96 mol [219.2 parts by mass]
Bisphenol S: 0.04 mol [10.4 parts by mass]
Paraformaldehyde (made by Mitsui Chemicals, Inc.): 2.50 mol [75.8 parts by mass] (in terms of formaldehyde)

A resin solution was obtained by reacting the second mixture (pH=8.6) at 95° C. for 10 hours. The bisphenol-based resin contained in the resin solution obtained in Example 1 was isolated by drying at a low temperature (60° C. for 6 hours), and the $^1$H-NMR spectrum was measured. The measurement result of the $^1$H-NMR spectrum of the bisphenol-based resin is shown in FIG. 1.

Examples 2 to 6 and Comparative Examples 1 to 3

The bisphenol-based resins and the resin solutions of Examples 2 to 6 and Comparative examples 1 to 3 were obtained by the same method as in Example 1, except that the constituent component of the resin solution was changed to components shown in Table 1. In Table 1, the amount of 37 mass % formalin is the amount in terms of formaldehyde.

<Evaluation of Bisphenol-Based Resin and Resin Solution>
[Measurement of Content of Structural Unit]

The content of the structural unit represented by the above described formula (I), in the isolated bisphenol-based resin, was determined according to the following expression, from a ratio of a peak integral value at 5.2 to 5.8 ppm, which originated in the benzoxazine ring, to a peak integral value at 0.1 to 2.3 ppm, which originated in the methyl group of the bisphenol A, in the $^1$H-NMR spectrum. The NMR conditions are as follows. The result is given as "amount of structural unit", and is shown in Table 1.

Amount of structural unit (mass %)=$[(a/2)/(b/6)]\times 100$ a: peak integral value at 5.2 to 5.8 ppm, which originates in benzoxazine ring b: peak integral value at 0.1 to 2.3 ppm, which originates in methyl group of bisphenol A (NMR Condition)
Apparatus: AV400M (made by Bruker BioSpin K.K.)
Measurement temperature: Room temperature (25° C.)
Measurement solvent: DMSO-d6 (Wako Pure Chemical Industries, Ltd.)

[Measurement of Nonvolatile Matter Content]

The nonvolatile matter content of the resin solution was measured by the following procedure. Firstly, 2 g of the resin solution was placed in a container (stainless steel petri dish) with 50 mmϕ×15 mm, and then the resin composition was dried at 150° C. for 60 minutes with a hot air drier. Next, after the temperature of the container had returned to room temperature (25° C.), a residual mass was measured to thereby measure the nonvolatile matter content. The result is shown in Table 1.

[Measurement of pH]

After the reaction had been completed, 500 μL of the resin solution was placed in a sensor portion of the following pH measurement device, and the pH of the resin solution was measured. The result is shown in Table 1.

(Condition of pH Measurement)
pH measurement device: Twin pH meter AS-212 made by Horiba, Ltd.
Calibration liquid: pH calibration liquid made by Horiba, Ltd. (pH 4.01 and pH 6.86)
Measurement temperature: 25° C.

[Measurement of Weight Average Molecular Weight]

The weight average molecular weight of the isolated bisphenol-based resin was measured with GPC on the following conditions. The result is shown in Table 1.

(GPC Condition)
Apparatus: High performance liquid chromatograph LC-2200 Plus (made by JASCO Corporation)
Pump: PU-2080
Differential refractometer: RI-2031
Detector: Ultraviolet visible absorptiometer UV-2075 (λ: 254 nm)
Column oven: CO-2065
Column: TSKgel SuperAW (4000), TSKgel SuperAW (3000) and TSKgel SuperAW (2500) (made by Tosoh Corporation)
Column temperature: 40° C.
Eluent: Methanol solution containing LiBr (10 mM) and triethylamine (200 mM)
Flow velocity: 0.6 mL/minute
Molecular weight standard sample: polyethylene glycol (molecular weight: $1.10 \times 10^6$, $5.80 \times 10^5$, $2.55 \times 10^5$, $1.46 \times 10^5$, $1.01 \times 10^5$, $4.49 \times 10^4$, $2.70 \times 10^4$ and $2.10 \times 10^4$; made by Tosoh Corporation), diethylene glycol (molecular weight: $1.06 \times 10^2$; made by Kishida Chemical Co., Ltd.), and dibutylhydroxytoluene (molecular weight: $2.20 \times 10^2$; made by Kishida Chemical Co., Ltd.)

Figure 2:
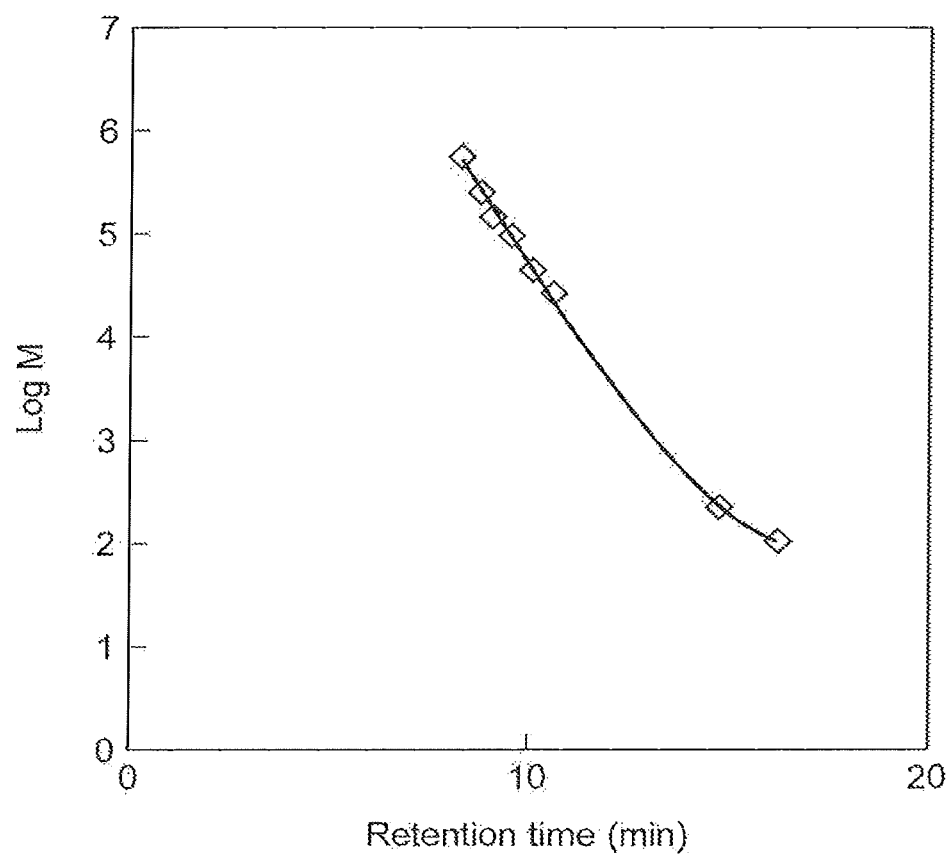
FIG. 2 is a view showing a calibration curve in a measurement of a weight average molecular weight.

The calibration curve calculated from the above described standard sample is shown in FIG. 2. The abscissa shows a retention time, and the ordinate shows a logarithm of the molecular weight.

<Production of Negative Electrode Plate>

Based on the total mass of the lead powder, 0.2 mass % of the resin solution in terms of the solid content, 0.2 mass % of furnace black and 1.0 mass % of barium sulfate were added to a lead powder, and then dry mixing was performed. Next, kneading was performed while dilute sulfuric acid (specific gravity of 1.26 (in terms of 20° C.)) and water were added, to thereby produce a negative electrode active material paste. An expanded current collector (lead-calcium-tin-based alloy) with a thickness of 0.6 mm was filled with the negative electrode active material paste to produce a negative electrode plate. Using an usual method, the negative electrode plate was left for 18 hours in an atmosphere at a temperature of 50° C. and a humidity of 95% to be aged, and then drying was performed in an atmosphere at a temperature of 50° C. to obtain a chemically unconverted negative electrode plate.

<Production of Positive Electrode Plate>

Based on the total mass of the lead powder, 0.01 mass % of a short fiber for reinforcement (polyethylene fiber) was added to a lead powder, and then dry mixing was performed. Next, a dilute sulfuric acid (specific gravity of 1.26 (in terms of 20° C.)) and water were added thereto, and kneading was performed to produce a positive electrode active material paste. A positive electrode current collector (lead-calcium-tin alloy) that is formed of a cast grid body was filled with the positive electrode active material paste; and it was left for 18 hours in an atmosphere at a temperature of 50° C. and a humidity of 95% to be aged, and then drying was performed in an atmosphere at a temperature of 50° C. to obtain a chemically unconverted positive electrode plate.

<Assembly of Battery>

The chemically unconverted negative electrode plate was inserted into a separator that was made from polyethylene and was in a sack shape. Next, so that the chemically unconverted positive electrode plates, and the chemically unconverted negative electrode plates inserted into the above described sack-shaped separators were alternately layered, six chemically unconverted negative electrode plates and five chemically unconverted positive electrode plates were layered. Subsequently, edge portions of the polar plates having the same polarity were welded to each other by a cast-on strap (COS) method to produce a polar plate group. The above described polar plate group was inserted into a battery case to assemble a 2V single cell battery. Into this battery, a dilute sulfuric acid (specific gravity of 1.28 (in terms of 20° C.)) was injected, and then chemical conversion was performed in a water bath at 50° C. on the conditions of a passing current of 10 A and 16 hours, and therefore the lead storage battery was obtained.

<Evaluation of Battery Characteristics>

The charge acceptability, the discharge characteristics and the cycle characteristics of the above described 2V single cell battery were measured in the following manner. The measurement results of the charge acceptability, the discharge characteristics and the cycle characteristics of Comparative Example 1 were each defined as 100, and each of the characteristics was relatively evaluated. The result is shown in Table 1.

(Charge Acceptability)

As for the charge acceptability, in a state in which state of charge of the battery has become 90%, in other words, 10% of the battery capacity was discharged from a fully charged state, an electric current value was measured after 5 seconds has passed when charging was performed at a constant voltage of 2.33 V. As the electric current value after 5 seconds is larger, it is evaluated as the battery having more adequate initial charge acceptability.

(Discharge Characteristics)

As for the discharge characteristics, discharging was performed at a constant current of 5 C at −15° C., and a discharge duration time was measured until the voltage of the battery has reached 1.0 V. As the discharge duration time is longer, it is evaluated as the battery having more excellent discharge characteristics. The above described C means "discharging current value (A)/battery capacity (Ah)".

(Cycle Characteristics)

The cycle characteristics were evaluated by a method according to light load life test (JIS D 5301) in Japanese Industrial Standard. As the number of cycles is larger, it is evaluated as the battery having higher durability.

<Evaluation of Storage Stability>

The storage stability was measured according to the following procedure. 30 mL of a resin solution was placed in a glass container with ϕ30 mm×65 mm, and then stored at 40° C. using a thermostatic bath. Every one month, the above described 2V single cell battery was produced by using this resin solution, and the above described battery characteristics were measured. The charge acceptability, the discharge characteristics and the cycle characteristics were evaluated as the battery characteristics by the same method as described above. It was evaluated that the stockable limit was reached when the charge acceptability had decreased by 2%, the discharge characteristics had decreased by 2%, or the cycle characteristics had decreased by 10%, as compared with before storage. The result is shown in Table 1.

TABLE 1

| | | Example 1 | Example 2 | Example 3 | Example 4 | Example 5 | Example 6 | Comparative example 1 | Comparative example 2 | Comparative example 3 |
|---|---|---|---|---|---|---|---|---|---|---|
| Bisphenol A | Parts by mass | 219.2 | 187.2 | 228.3 | 228.3 | 219.2 | 219.2 | 228.3 | 228.3 | 219.2 |
| | Mol | (0.96) | (0.82) | (1.00) | (1.00) | (0.96) | (0.96) | (1.00) | (1.00) | (0.96) |
| Bisphenol S | Parts by mass | 10.4 | 44.5 | — | — | 10.4 | 10.4 | — | — | 10.4 |
| | Mol | (0.04) | (0.18) | | | (0.04) | (0.04) | | | (0.04) |
| Aminobenzene-sulfonic acid | Parts by mass | 173.2 | 173.2 | 173.2 | 173.2 | 173.2 | 138.6 | 173.2 | 346.4 | 173.2 |
| | Mol | (1.00) | (1.00) | (1.00) | (1.00) | (1.00) | (0.80) | (1.00) | (2.00) | (1.00) |
| Paraformaldehyde | Parts by mass | 75.8 | 75.8 | 75.8 | 75.8 | 84.9 | 69.7 | — | — | 90.9 |
| | Mol | (2.50) | (2.50) | (2.50) | (2.50) | (2.80) | (2.30) | | | (3.00) |
| 37 mass % formalin | Parts by mass | — | — | — | — | — | — | 210.8 | 291.9 | — |
| | Mol | | | | | | | (2.60) | (3.60) | |
| Water | Parts by mass | 792.6 | 792.6 | 792.6 | 3028.3 | 792.6 | 792.6 | 738 | 738 | 792.6 |
| | Mol | (44.0) | (44.0) | (44.0) | (168.0) | (44.0) | (44.0) | (41.0) | (41.0) | (44.0) |
| Sodium hydroxide | Parts by mass | 42.0 | 42.0 | 42.0 | 42.0 | 42.0 | 34.0 | 40.0 | 80.0 | 42 |
| | Mol | (1.05) | (1.05) | (1.05) | (1.05) | (1.05) | (0.84) | (1.00) | (2.00) | (1.05) |
| Amount of structural unit (mass %) | | 6 | 7 | 6 | 8 | 15 | 10 | 16 | 30 | 31 |
| Nonvolatile matter content (mass %) | | 40 | 40 | 40 | 15 | 40 | 40 | 38 | 44 | 40 |
| pH | | 7.8 | 7.8 | 8.1 | 7.7 | 7.8 | 7.6 | 7.4 | 7.7 | 7.9 |
| Weight average molecular weight (Mw) | | 49900 | 45900 | 51000 | 42000 | 53000 | 60900 | 56300 | 21100 | 61600 |
| Charge acceptability | | 110 | 105 | 105 | 105 | 112 | 115 | 100 | 95 | 110 |
| Discharge characteristics | | 105 | 120 | 100 | 100 | 105 | 90 | 100 | 105 | 105 |
| Cycle characteristics | | 220 | 230 | 195 | 190 | 190 | 230 | 100 | 80 | 200 |
| Storage stability (month) | | 3 | 3 | 3 | 2 | 2 | 3 | 1 | 1 | 1 |

It can be confirmed that the storage stability in the Examples is excellent as compared with the Comparative examples. In addition, in the Examples 1 and 2 in which the bisphenol-based resin obtained by using bisphenol A and bisphenol S together was used, it can be confirmed that the cycle characteristics is remarkably improved. In the Examples, it can be confirmed that the excellent charge acceptability, discharge characteristics, cycle characteristics and storage stability are all provided.

INDUSTRIAL APPLICABILITY

The present invention can provide a bisphenol-based resin that is excellent in the storage stability, and a production method for the same. In addition, the present invention can provide a resin composition that contains the above described bisphenol-based resin, and the production method for the same. Furthermore, the present invention can provide an electrode and a lead storage battery that are produced by using the above described bisphenol-based resin, and production methods for these.

REFERENCE SIGNS LIST

1 . . . lead storage battery, 2 . . . electrolytic bath, 3 . . . cover, 4 . . . positive electrode terminal, 5 . . . negative electrode terminal, 6 . . . liquid vent plug, 11 . . . electrode plate group, 12 . . . positive electrode plate, 13 . . . negative electrode plate, 14 . . . bag-like separator, 15 . . . positive electrode-side strap, 16 . . . negative electrode-side strap, 17 . . . connecting part between cells, 18 . . . electrode pole, 22, 32 . . . current collector portion.

The invention claimed is:

1. An electrode, comprising:
an electrode layer comprising an electrode active material or a raw material of an electrode active material and a bisphenol-based resin having a benzoxazine ring; and a current collector supporting the electrode layer, wherein the bisphenol-based resin is obtained by a reaction of (a) a bisphenol-based compound, (b) at least one selected from the group consisting of aminobenzenesulfonic acids and aminobenzenesulfonic acid derivatives, and (c) at least one selected from the group consisting of formaldehyde and formaldehyde derivatives, and wherein
a content of a structural unit that is obtained by a reaction of the component (a), the component (b) and the component (c) and also has a benzoxazine ring is 15 mass % or less based on a total mass of the bisphenol-based resin.

2. The electrode according to claim 1, wherein the structural unit is represented by the following general formula (I):

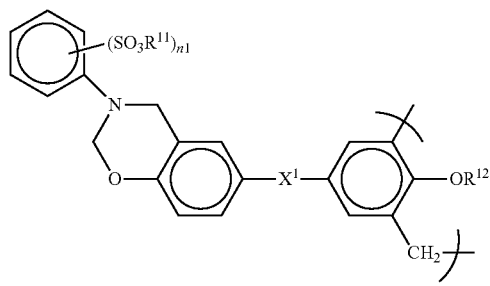

(I)

wherein in formula (I), X1 represents a divalent group, R11 and R12 each independently represent an alkali metal or a hydrogen atom, n1 represents an integer of 1 to 3, and a hydrogen atom that is directly bonded to a carbon atom constituting a benzene ring may be substituted with an alkyl group or a methylol group.

3. The electrode according to claim 1, wherein a weight average molecular weight of the bisphenol-based resin is 30000 to 70000.

4. A lead storage battery comprising the electrode according to claim 1.

5. An electrode, comprising:
an electrode layer comprising an electrode active material or a raw material of an electrode active material and a bisphenol-based resin having a benzoxazine ring; and a current collector supporting the electrode layer, wherein the bisphenol-based resin has at least one selected from the group consisting of a structural unit represented by the following general formula (III) and a structural unit represented by the following general formula (IV),
a content of a structural unit represented by the following general formula (I) is 15 mass % or less based on a total mass of the bisphenol-based resin,

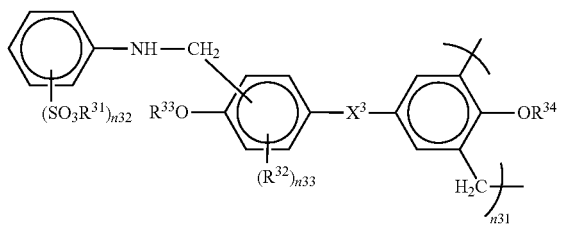

(III)

in formula (III), X3 represents a divalent group, R31, R33 and R34 each independently represent an alkali metal or a hydrogen atom, R32 represents a methylol group, n31 represents an integer of 1 to 300, n32 represents an integer of 1 to 3, n33 represents 0 or 1,

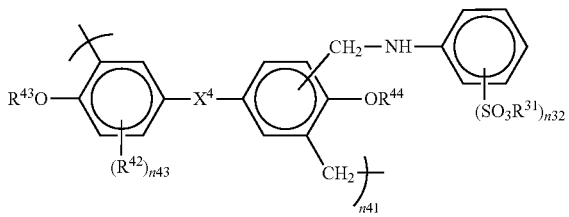

(IV)

in formula (IV), X4 represents a divalent group, R41, R43 and R44 each independently represent an alkali metal or a hydrogen atom, R42 represents a methylol group, n41 represents an integer of 1 to 300, n42 represents an integer of 1 to 3, n43 represents 0 or 1, and

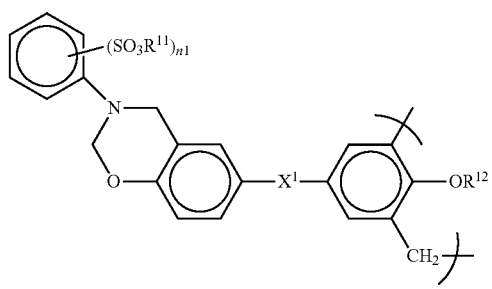

(I)

in formula (I), X1 represents a divalent group, R11 and R12 each independently represent an alkali metal or a hydrogen atom, n1 represents an integer of 1 to 3, and a hydrogen atom that is directly bonded to a carbon atom constituting a benzene ring may be substituted with an alkyl group or a methylol group.

6. The electrode according to claim 5, wherein a weight average molecular weight of the bisphenol-based resin is 30000 to 70000.

7. A lead storage battery comprising the electrode according to claim 5.

8. An electrode, comprising:
an electrode layer comprising an electrode active material or a raw material of an electrode active material and a bisphenol-based resin having a benzoxazine ring; and
a current collector supporting the electrode layer, wherein
the bisphenol-based resin has a structure derived from a reaction of (a) a bisphenol-based compound, (b) at least one selected from the group consisting of aminobenzenesulfonic acids and aminobenzenesulfonic acid derivatives, and (c) at least one selected from the group consisting of formaldehyde and formaldehyde derivatives, and wherein
a content of a structural unit derived from a reaction of the component (a), the component (b) and the component (c) and also has a benzoxazine ring is 15 mass % or less based on a total mass of the bisphenol-based resin.

9. The electrode according to claim 8, wherein the structural unit is represented by the following general formula (I):

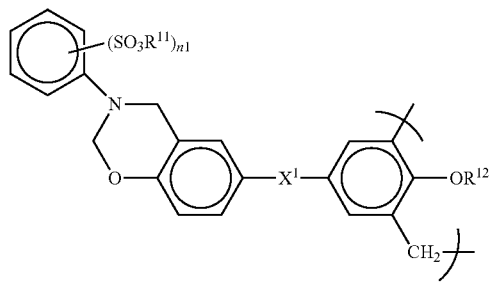

(I)

wherein, in formula (I), X1 represents a divalent group, R11 and R12 each independently represent an alkali metal or a hydrogen atom, n1 represents an integer of 1 to 3, and a hydrogen atom that is directly bonded to a carbon atom constituting a benzene ring may be substituted with an alkyl group or a methylol group.

10. The electrode according to claim 8, wherein a weight average molecular weight of the bisphenol-based resin is 30000 to 70000.

11. A production method for an electrode, comprising:
applying an electrode active material paste to a current collector; and
aging and drying the electrode active material paste, wherein the electrode active material paste includes a bisphenol-based resin having a benzoxazine ring obtained by a production method for a bisphenol-based resin, the production method comprising a step of reacting (a) a bisphenol-based compound, (b) at least one selected from the group consisting of aminobenzenesulfonic acids and aminobenzenesulfonic acid derivatives, and (c) at least one selected from the group consisting of formaldehyde and formaldehyde derivatives, to obtain a bisphenol-based resin, and wherein
a content of a structural unit that is obtained by a reaction of the component (a), the component (b) and the component (c) and also has a benzoxazine ring is 15 mass % or less based on a total mass of the bisphenol-based resin.

12. The production method for an electrode according to claim 11, wherein the component (a) includes 2,2-bis(4-hydroxyphenyl)propane.

13. The production method for an electrode according to claim 11, wherein the component (a) includes bis(4-hydroxyphenyl)sulfone.

14. The production method for an electrode according to claim 11, wherein the structural unit is represented by the following general formula (I):

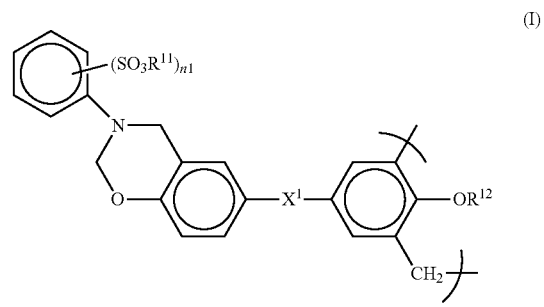

(I)

wherein, in formula (I), X1 represents a divalent group, R11 and R12 each independently represent an alkali metal or a hydrogen atom, n1 represents an integer of 1 to 3, and a hydrogen atom that is directly bonded to a carbon atom constituting a benzene ring may be substituted with an alkyl group or a methylol group.

15. The production method for an electrode according to claim 14, wherein X1 represents isopropylidene group.

16. The production method for an electrode according to claim 14, wherein X1 represents sulfonyl group.

17. The production method for an electrode according to claim 14, wherein at least one selected from the group consisting of R11 and R12 include sodium or potassium.

18. The production method for an electrode according to claim 11, wherein a weight average molecular weight of the bisphenol-based resin is 30000 to 70000.

19. The production method for an electrode according to claim 11, wherein an amount of the component (b) is 0.5 to 1.3 mol with respect to 1 mol of the component (a), and an amount of the component (c) is 2 to 3.5 mol in terms of formaldehyde with respect to 1 mol of the component (a).

20. A production method for a lead storage battery, comprising a step of obtaining an electrode by the production method for an electrode according to claim 11, alternately layering the electrode with another electrode via a separator to form a polar plate group, and arranging the polar plate group in a battery case.

* * * * *